(12) United States Patent
Vanderheyden

(10) Patent No.: US 6,915,975 B2
(45) Date of Patent: Jul. 12, 2005

(54) TAPE LEADER MEANS FOR PULLING TAPE FROM A REEL

(75) Inventor: William J. Vanderheyden, Loveland, CO (US)

(73) Assignee: Storage Technology Corporation, Louisville, CO (US)

(*) Notice: Subject to any disclaimer, the term of this patent is extended or adjusted under 35 U.S.C. 154(b) by 103 days.

(21) Appl. No.: 10/688,008

(22) Filed: Oct. 17, 2003

(65) Prior Publication Data

US 2005/0082406 A1 Apr. 21, 2005

(51) Int. Cl.[7] .................................. G11B 15/66
(52) U.S. Cl. .............................. 242/332.4; 360/132
(58) Field of Search ................ 242/332.4, 332.1, 242/332.2, 332, 348, 348.2, 348.3, 532, 532.1, 532.6, 532.7, 582; 360/132

(56) References Cited

U.S. PATENT DOCUMENTS

| | | | | |
|---|---|---|---|---|
| 1,655,297 A | * | 1/1928 | John | 242/332.4 |
| 3,197,150 A | * | 7/1965 | Camras | 242/332.4 |
| 3,594,512 A | * | 7/1971 | Castagna | 242/332.4 |
| 3,706,423 A | * | 12/1972 | Neff | 242/332.4 |
| 3,724,776 A | * | 4/1973 | McKee | 242/332.4 |
| 3,880,382 A | * | 4/1975 | Jantzen et al. | 242/332.4 |
| 4,572,460 A | | 2/1986 | Hertrich | |
| 4,720,913 A | * | 1/1988 | Hertrich | 242/332.4 |
| 5,326,045 A | * | 7/1994 | Konshak et al. | 360/95 |
| 5,979,813 A | | 11/1999 | Mansbridge et al. | 242/332.4 |
| 6,142,402 A | | 11/2000 | Reilly | 242/332.8 |
| 6,311,915 B1 | | 11/2001 | Rathweg | |
| 6,360,979 B1 | * | 3/2002 | Larson | 242/332.4 |
| 6,439,489 B1 | * | 8/2002 | Hoge | 242/332.4 |
| 6,568,617 B1 | * | 5/2003 | Rambosek | 242/332.4 |

FOREIGN PATENT DOCUMENTS

| | | |
|---|---|---|
| EP | 0932155 A | 4/2002 |
| JP | 2001 316031 A | 11/2001 |

* cited by examiner

*Primary Examiner*—William A. Rivera
(74) *Attorney, Agent, or Firm*—Yee & Associates P.C.

(57) ABSTRACT

An improved two-leader apparatus is disclosed for threading tape from a first reel to a second reel. The two-leader means includes a first reel for receiving tape from a second reel. A first leader is coupled to the first reel. A second leader is coupled to a free end of the tape which is wound around the second reel. A button is coupled to a first end of the first leader. The button protrudes from a first surface of the first leader. The second leader includes an aperture for accepting the button.

14 Claims, 3 Drawing Sheets

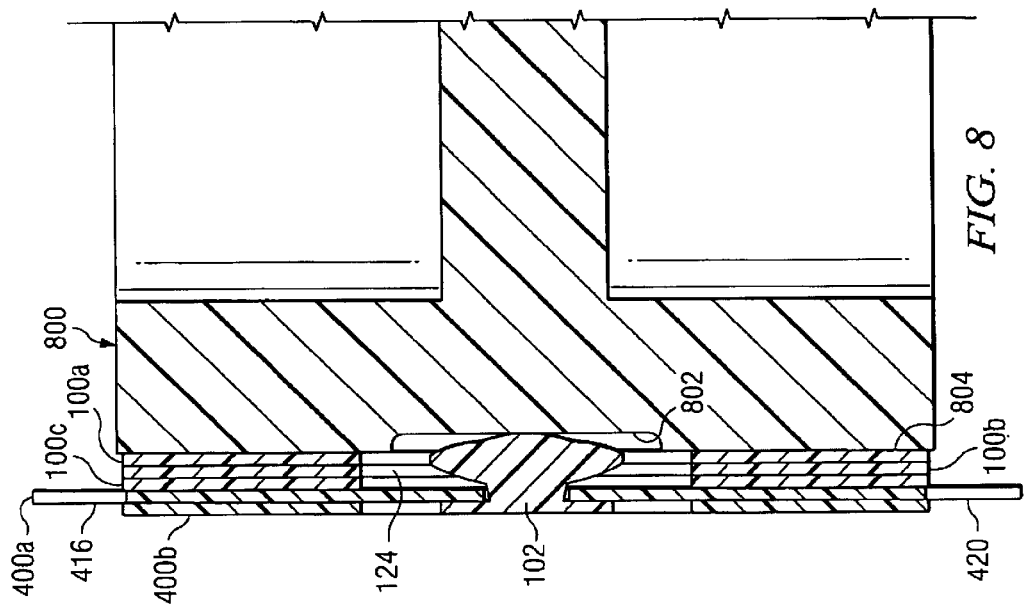
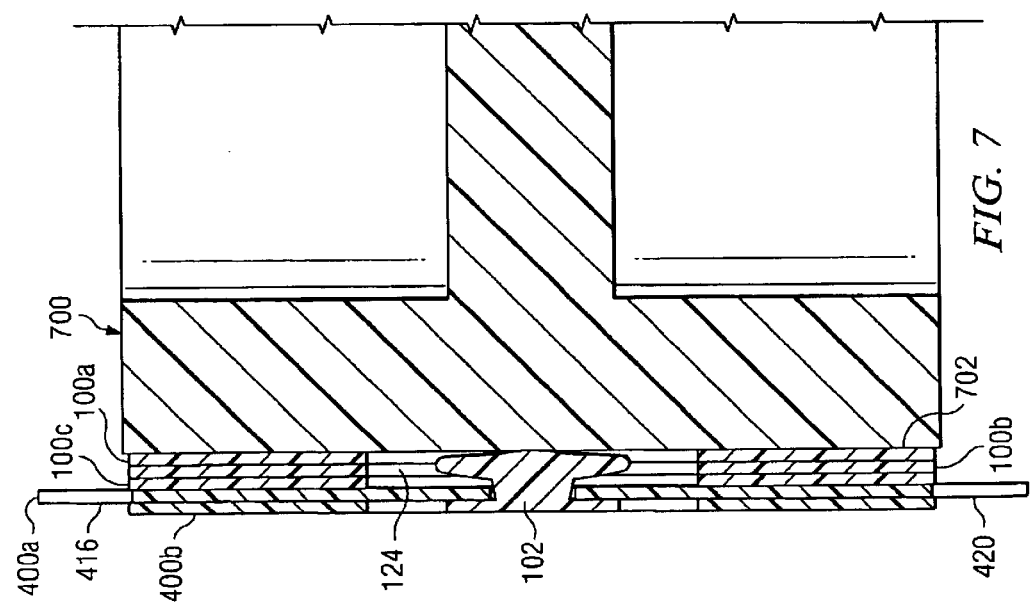

TAPE LEADER MEANS FOR PULLING TAPE FROM A REEL

BACKGROUND OF THE INVENTION

1. Field of the Invention

The present invention relates generally to data storage devices and particularly to an improved tape leader apparatus for pulling tape from a reel.

2. Background of the Invention

Magnetic tape is frequently used to store digital data. Such tape may be housed in a tape cartridge that protects the tape from damage. Prior to use, the tape from a tape cartridge, which is the supply reel, must be connected to an empty drive reel which will act as a take-up reel. The tape may then be transferred from the supply, or cartridge, reel to the drive reel during use. In order to transfer tape from the supply reel to the drive reel, there must be a mechanism for attaching the tape from the cartridge reel to the empty drive reel.

There are currently two commonly used methods for coupling the tape from the cartridge reel to the drive reel. One method is to use a tape leader block. A leader block is attached to a free end of the tape and is used to withdraw the tape from the cartridge for read/write operations. A threading mechanism, such as a threading or loading post or arm, grabs the leader block and pulls it from the cartridge. The threading mechanism then pulls the leader block through the tape path which includes a series of guide posts or bearings, across a longitudinal read/write head, and into a slot in a take-up reel.

The leader block and take-up reel are precisely manufactured so that when the leader block is inserted into the slot in the take-up reel, the slot is sufficiently closed by an end of the leader block to create a relatively smooth surface on the hub of the take-up reel. Ideally, the leader block should cover the slot such that the interface between the end of the leader block and the hub is perfectly smooth. Such a perfectly smooth interface, however, is not practical to manufacture. Therefore, small discontinuities between the leader block and the hub are always present. Such discontinuities can cause impressions in the first wraps of the tape around the hub. These impressions may affect the ability to retrieve data stored on the tape, which results in data errors. To ensure data integrity, a known practice involves not writing data to the portions of the tape having impressions. For example, if the first 100 wraps of the tape are typically affected by tape impressions, then no data is stored on the first 100 wraps of the tape. Such a practice, however, results in wasted data storage capability and wasted time. When the tape path is long with many turns and tight spaces as is typical in many modern tape drives, the threading mechanism required for the tape leader block method would be very complicated and costly.

A second method for threading the tape from the cartridge reel to the drive reel is to use a two-leader method, one tape leader on the cartridge reel and one tape leader on the drive reel. The drive then connects the two leaders and winds them onto the drive reel. The tape is then pulled by the connected leaders from the cartridge reel onto the drive reel. A first tape leader is formed at the free end of the tape, which is on the cartridge reel. A second tape leader is connected to the drive reel. According to one prior art method disclosed by U.S. Pat. No. 4,572,460, the first tape leader has an enlarged flat tab supported by a stem portion. The tab is flat in the same plane as the tape and is flush with the tape. The second tape leader has a locking aperture at one end through which the enlarged tab can pass or be pushed.

This prior art method does not reliably make the connection coupling the two leaders together. Further, the connection between the leaders, once made, is not very strong and may result in the leaders disconnecting improperly during use.

Therefore, the current technology would be improved by providing an improved tape leader apparatus for pulling tape from a reel.

SUMMARY OF THE INVENTION

An improved two-leader apparatus is disclosed for threading tape from a first reel to a second reel. The two-leader means includes a first reel for receiving tape from a second reel. A first leader is coupled to the first reel. A second leader is coupled to a free end of the tape which is wound around the second reel. A button is coupled to a first end of the first leader. The button protrudes from a first surface of the first leader prior to the two leaders being coupled together. The second leader includes an aperture for accepting the button.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a sectional view of the drive leader of FIG. 1 and the cartridge leader of FIG. 4 coupled together and wound on a hub that has no recess in accordance with the present invention;

FIG. 8 is a sectional view of the drive leader of FIG. 1 and the cartridge leader of FIG. 4 coupled together and wound on a hub that has a recess for receiving a protruding button in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

Figure 1:
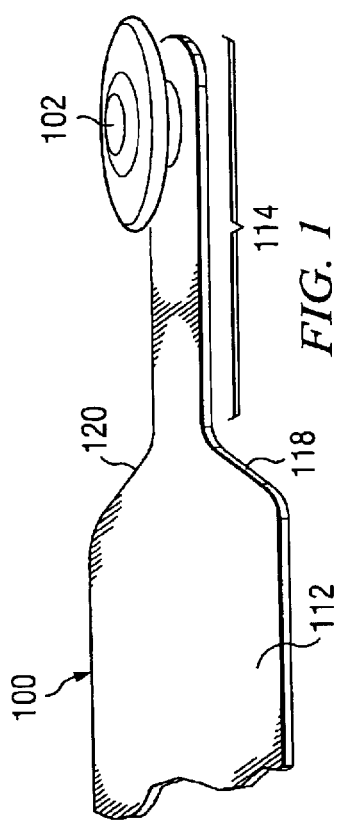
FIG. 1 is a perspective view of a drive leader including a protruding button in accordance with the present invention.
Figure 2:
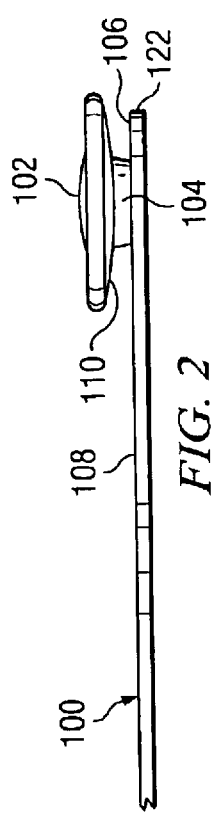
FIG. 2 is a side view of the drive leader of FIG. 1 in accordance with the present invention.
Figure 3:
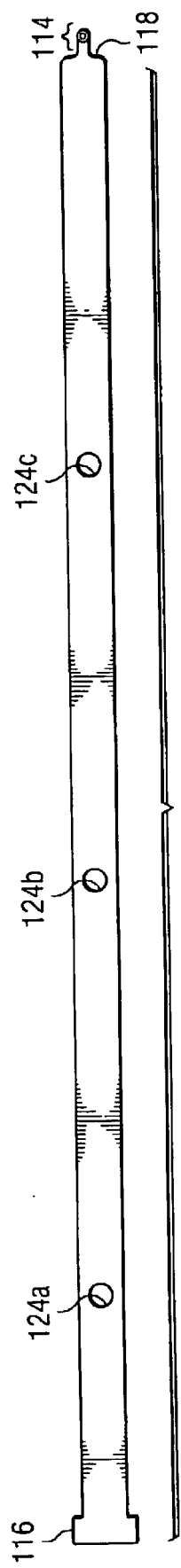
FIG. 3 is a top view of the drive leader of FIG. 1 in accordance with the present invention.

FIG. 1 is a perspective view of a drive leader 100 including a protruding button 102 in accordance with the present invention. FIG. 2 is side view of the drive leader of FIG. 1 in accordance with the present invention. FIG. 3 is a top view of the drive leader of FIG. 1 in accordance with the present invention.

Referring to FIGS. 1–3, button 102 sits atop a base 104 creating a gap 106 between a first surface 108 of leader 100 and a bottom 110 of button 102. Button 102 and base 104 together are generally mushroom shaped. Drive leader 100 includes a first portion 112 and a second portion 114. First portion 112 has a first end 116 and a second end 118. Drive leader 100 is attached to a drive reel (not shown). First end 116 of first portion 112 is attached to the drive reel. Second portion 114 has a first end 120 and a second end 122. Button 102 is attached to and protrudes from second end 122 of second portion 114.

Second portion 114 is narrower than first portion 112. First portion 112 is approximately the width of the tape. Second portion 114 is a narrow neck having end 122 from which button 102 protrudes.

Drive leader 100 includes a plurality of spacing apertures 124a–c. In a preferred embodiment, spacing apertures 124a–c are spaced longitudinally throughout first portion 112 roughly one reel revolution apart from one another. Spacing apertures 124a–c provide space for button 102 when drive leader 100 is wound around the drive reel. Spacing apertures 124a–c permit button 102 to be nested into the wound tape without causing tape pack impressions.

Figure 4:
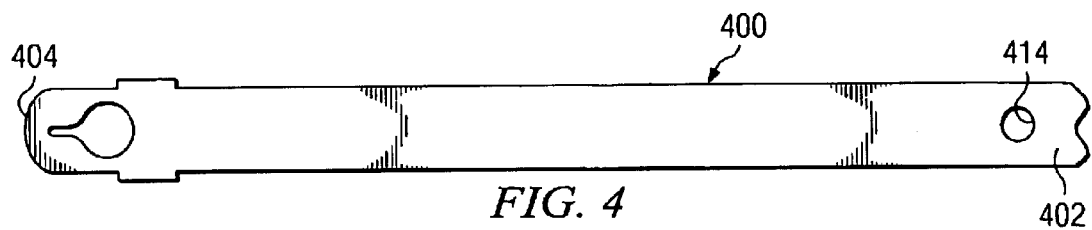
FIG. 4 is top view of a cartridge leader in accordance with the present invention.
Figure 5:
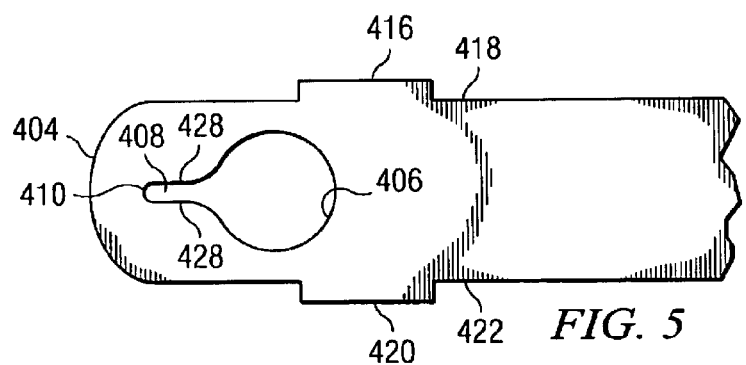
FIG. 5 is a perspective view of the cartridge leader of FIG. 4 in accordance with the present invention.

FIG. 4 is top view of a cartridge leader 400 in accordance with the present invention. FIG. 5 is a perspective view of cartridge leader 400 of FIG. 4 in accordance with the present invention.

Referring to FIGS. 4 and 5, cartridge leader 400 has a first end 402 and a second end 404. Tape is wound around a cartridge reel (not shown). The tape terminates in a free end that may be used to pull the tape from the cartridge reel. First end 402 is coupled to the free end of the tape. The tape may be pulled from the cartridge reel by pulling cartridge leader 400, which in turn pulls the free end of the tape, and consequently the rest of the tape from the cartridge reel.

Cartridge leader 400 includes a circular aperture 406 located at second end 404. Aperture 406 is formed to accept button 102 through aperture 406 when drive leader 100 and cartridge leader 400 are coupled together. Once button 102 is received through aperture 406, drive leader 100 is pulled away from cartridge leader 400 so as to cause button 102 to move through and then out of aperture 406 and into a locking slit 408 until button reaches an end 410 of slit 408. When button 102 reaches end 410 of slit 408, button 102 is locked into place and drive leader 100 and cartridge leader 400 are connected together.

Slit 408 extends longitudinal along cartridge leader 400 from one side of aperture 408 and terminates at end point 410 which is nearer second end 404. Spacing aperture 414 is located near first end 402. Spacing aperture 414 is spaced within cartridge leader 400 so as to receive button 102 when first drive leader 100 and cartridge leader 400 are coupled together and wound around a reel. Spacing aperture 414 permits button 102 to be nested into the wound tape without causing tape pack impressions.

Cartridge leader 400 includes a first flange 416 which extends out from side 418 and second flange 420 which extends out from side 422. Flanges 416 and 420 are flat in the same plane as leader 400.

Figure 6:
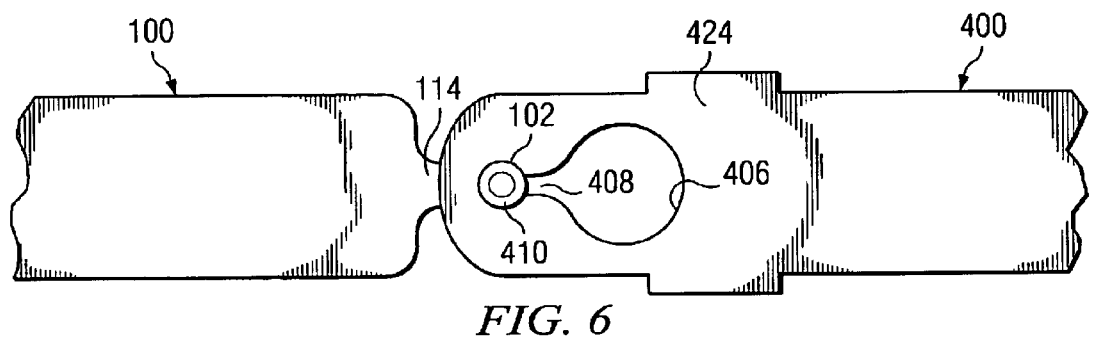
FIG. 6 is a perspective view of the drive leader of FIG. 1 and the cartridge leader of FIG. 4 coupled together in accordance with the present invention.

FIG. 6 is a perspective view of drive leader 100 of FIG. 1 and cartridge leader 400 of FIG. 4 coupled together in accordance with the present invention. When tape is to be pulled from the cartridge reel and wound onto the drive reel, a drive mechanism (not shown) inserts button 102 into aperture 406. Drive leader 100 is then pulled away from cartridge leader 400 in order to lock the two leaders together. When drive leader 100 is pulled away from cartridge leader 400, button 102 moves out of aperture 406 and into locking slit 408. Button 102 remains above top surface 424 of cartridge leader 400 while neck 114 of drive leader 100 moves underneath end 404 of cartridge leader 400. In this manner, cartridge leader 400 surrounds base 104 such that sides 426 and 428 of slit 408 are received within gap 106. When drive leader 100 and cartridge leader 400 are locked together, end 410 is secured against base 104 with button 102 being located above surface 424 while neck 114 is located below cartridge leader 400.

FIG. 7 is a sectional view of drive leader 100 of FIG. 1 and cartridge leader 400 of FIG. 4 coupled together and wound on a hub 700 that has no recess in accordance with the present invention. Hub 700 has a surface 702 against which three revolutions of drive leader 100 and then two revolutions of cartridge leader 400 are received. Button 102 abuts surface 702 when drive leader 100 and cartridge leader 400 are wound around hub 700.

Figure 9:
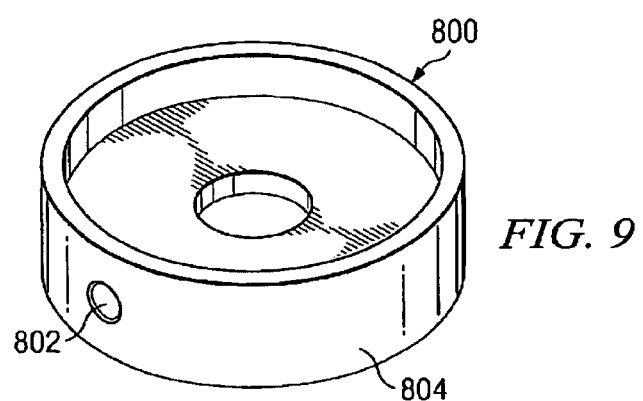
FIG. 9 is a perspective view of the hub of FIG. 8 that has a recess for receiving a protruding button in accordance with the present invention.

FIG. 8 is a sectional view of the drive leader of FIG. 1 and the cartridge leader of FIG. 4 coupled together and wound on a hub that has a recess for receiving a protruding button in accordance with the present invention. FIG. 9 is a perspective view of the hub of FIG. 8 that has a recess for receiving a protruding button in accordance with the present invention. Hub 800 has a surface 802 against which three revolutions of drive leader 100 and then two revolutions of cartridge leader 400 are received. Hub 804 also includes a recess 804 for receiving a top portion of button 102 when drive leader 100 and cartridge leader 400 are wound around hub 800. In this manner, a larger button may be used to lock the drive and cartridge leaders together. A larger button permits a more secure and stable lock between the drive and cartridge leaders.

The present invention provides for a button that protrudes from a leader prior to the leader being coupled to a second leader. A protruding button is a more reliable connection method than the flat T-shaped leaders of the prior art. Further, the present invention button may be nested into spacing apertures and/or a hub recess in order to avoid tape pack impressions.

The present invention button allows for a longer tape path since a threader arm needed for a leader block method is not necessary. Further, the protruding button is lower in cost to manufacture than the treading mechanisms of the prior art.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tape leader apparatus for pulling tape from a reel, said tape leader apparatus comprising:
   a first reel for receiving tape from a second reel;
   a first leader coupled to said first reel;
   a second leader coupled to a free end of said tape, said tape being wound around said second reel;

a button coupled to a first end of said first leader and protruding from a first surface of said first leader; and said second leader including an aperture for accepting said button to couple said first and second leaders together.

2. The tape leader apparatus according to claim 1, further comprising:

said second leader including a locking slit;

said button being received within said locking slit when said first and second leaders are coupled together.

3. The tape leader apparatus according to claim 1, further comprising:

a base coupled to said surface and said button for supporting said button above said surface.

4. The tape leader apparatus according to claim 3, further comprising:

said base and said button together being mushroom-shaped.

5. The tape leader apparatus according to claim 1, further comprising:

said first leader having a first portion and a second portion;

said first portion having a first end connected to said first reel and a second end connected to said second portion;

said second portion including a first end and a second end, said first end being a narrow neck portion that is narrower than a width of said first portion; and said button being coupled to said second end of said second portion.

6. The tape leader apparatus according to claim 1, further comprising:

said first leader including a plurality of spacing apertures for providing space for receiving said button and preventing indentations in said tape when said first and second leaders are coupled together.

7. The tape leader apparatus according to claim 6, further comprising:

said plurality of spacing apertures being spaced throughout said first leader one revolution apart.

8. The tape leader apparatus according to claim 1, further comprising:

a wrapping aperture in said first leader located at said second end of said first portion for receiving said button when said first leader is wound on a hub.

9. The tape leader apparatus according to claim 1, further comprising:

a gap formed between a bottom of said protruding button and said first surface for receiving said second leader when said first and second leaders are coupled together.

10. The tape leader apparatus according to claim 1, further comprising:

said first reel having a hub;

said hub having a recess for receiving said button when said first and second leaders and said tape are wrapped around said hub.

11. The tape leader apparatus according to claim 1, further comprising:

said second leader including a single spacing aperture for providing space for receiving said button and preventing indentations in said tape when said first and second leaders are coupled together.

12. The tape leader apparatus according to claim 1, further comprising:

said second leader including a first and second flange;

said first flange located along a first side of said second leader; and said second flange located along a second side of said second leader.

13. A tape leader apparatus for pulling tape from a reel, said tape leader apparatus comprising:

a first reel for receiving tape from a second reel;

a first leader coupled to said first reel;

a second leader coupled to a free end of said tape, said tape being wound around said second reel;

a button coupled to a first end of said first leader and protruding from a first surface of said first leader;

said second leader including an aperture for accepting said button;

said second leader including a locking slit;

said button being received within said locking slit when said first and second leaders are coupled together;

a base coupled to said surface and said button for supporting said button above said surface;

said base and said button together being mushroom-shaped;

a gap formed between a bottom of said protruding button and said first surface for receiving said second leader when said first and second leaders are coupled together;

said first leader having a first portion and a second portion;

said first portion having a first end connected to said first reel and a second end connected to said second portion;

said second portion including a first end and a second end, said first end being a narrow neck portion that is narrower than a width of said first portion;

said button being coupled to said second end of said second portion;

said first leader including a plurality of spacing apertures for providing space for receiving said button and preventing indentations in said tape when said first and second leaders are coupled together;

said plurality of spacing apertures being spaced throughout said first leader one revolution apart;

a wrapping aperture in said first leader located at said second end of said first portion for receiving said button when said first leader is wound on a hub;

said first reel having a hub;

said hub having a recess for receiving said button when said first and second leaders and said tape are wrapped around said hub;

said second leader including a single spacing aperture for providing space for receiving said button and preventing indentations in said tape when said first and second leaders are coupled together;

said second leader including a first and second flange;

said first flange located along a first side of said second leader; and said second flange located along a second side of said second leader.

14. A method for pulling tape from a reel, said method comprising:

inserting a button that is coupled to a first end of a first leader through an aperture that is located in a second leader;

said first leader being coupled to a first reel;

said second leader being coupled to a free end of a tape that is wound around said second reel, said first reel receiving said tape from said second reel; and locking said first and second leaders together by pulling said first leader away from said second leader causing said button to move out of said aperture and into a locking slit that is formed at one side of said aperture.

* * * * *